UNITED STATES PATENT OFFICE.

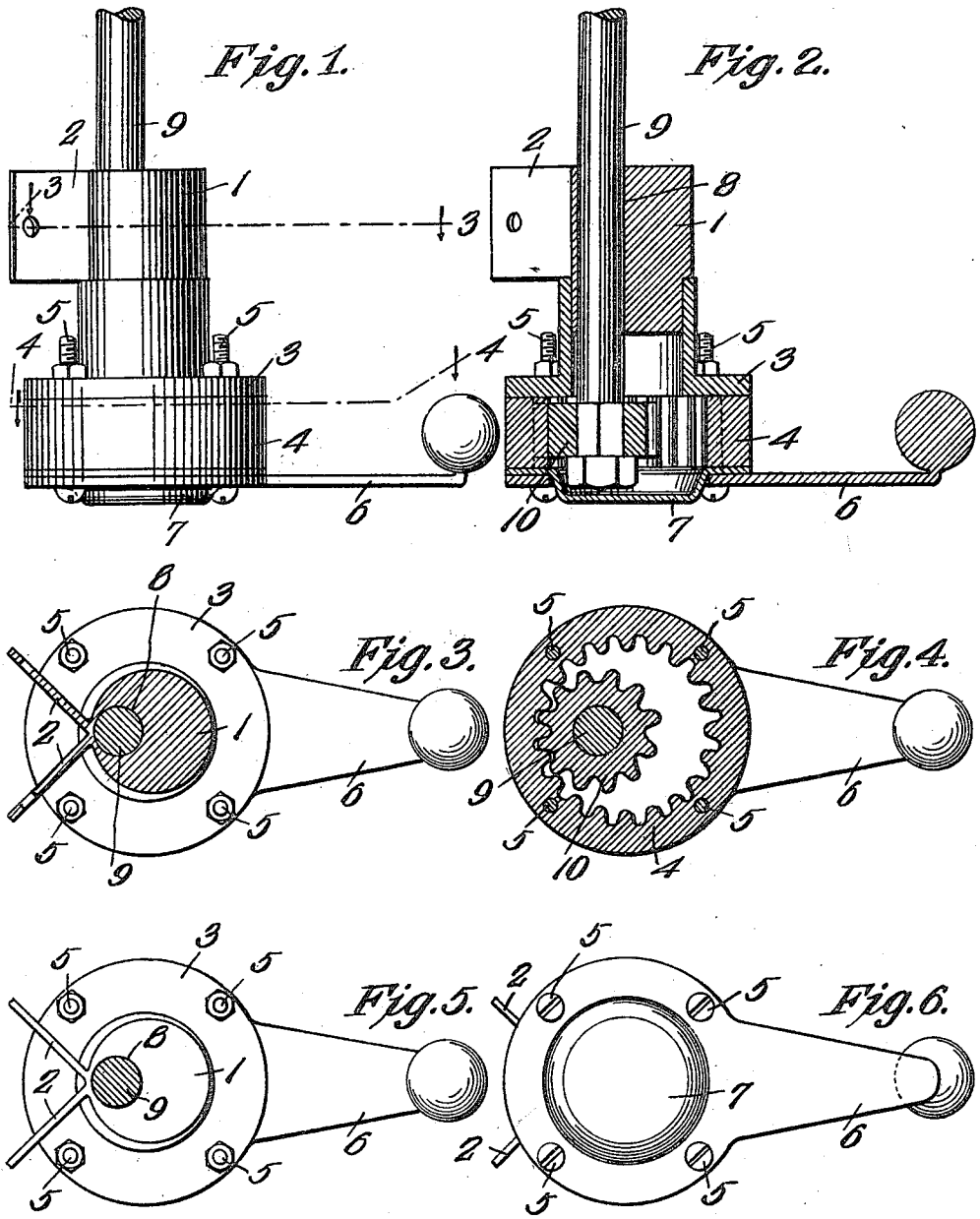

WILLIAM BIRDLE ELAM, OF ARMOUR, SOUTH DAKOTA, ASSIGNOR OF ONE-HALF TO J. E. BOOT, OF ARMOUR, SOUTH DAKOTA.

STEERING DEVICE FOR AUTOMOBILES.

1,214,144.  Specification of Letters Patent.  Patented Jan. 30, 1917.

Application filed May 1, 1916. Serial No. 94,717.

*To all whom it may concern:*

Be it known that I, WILLIAM BIRDLE ELAM, a citizen of the United States, residing at Armour, in the county of Douglas, State of South Dakota, have invented certain new and useful Improvements in Steering Devices for Automobiles; and I do hereby declare the following to be a full, clear, and exact description of the invention, such as will enable others skilled in the art to which it appertains to make and use the same.

This invention relates to a steering device for automobiles and is particularly adapted for use on Ford cars.

An object of the invention resides in the provision of a steering mechanism which is exceedingly simple in construction, cheap to manufacture and durable and which may be readily incorporated in a Ford car.

With these and other objects in view, such as will appear as my description progresses, my invention comprises the combination and arrangement of parts as set forth in and falling within the scope of the appended claims.

In the drawing: Figure 1 is an elevational view of my device; Fig. 2 is a vertical sectional view through the device; Fig. 3 is a horizontal sectional view on line 3—3 of Fig. 1; Fig. 4 is a similar view on line 4—4 of Fig. 1; Fig. 5 is a plan view, and Fig. 6 is a bottom plan view.

My device consists of a bearing member 1 which is cylindrical in form and which is adapted to be attached to the frame of the automobile by means of brackets 2. Rotatably mounted on the lower end of the bearing member 1 is a plate 3 to which an internal toothed gear 4 is attached by means of bolts 5. Secured to the lower side of this gear 4 is a steering arm 6 between which arm and gear a dust cap 7 is interposed to prevent the entrance of dust or dirt into the internal gear.

In order that this internal gear and steering arm 6 may be rotated so as to steer the automobile, I have provided the bearing member 1 with a passage 8 which extends from end to end thereof and eccentrically of the member. This passage is arranged for the reception of the steering rod 9 and secured to the lower end of this steering rod is a spur gear 10 which meshes with the internal gear 4 so that when the steering rod is turned the internal gear and the steering arm 6 will be turned. It is to be understood that the steering rod used is the rod which is at present used in the steering apparatus of the Ford machine and it will therefore only be necessary to insert this rod through the passage 8 and secure the spur gear 10 to the lower end thereof.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:

1. In a steering device for automobiles, the combination with a bearing member, of a plate rotatably mounted thereon, an internal toothed gear carried by the plate, a steering rod extending through the bearing member and into the gear, a pinion on the steering rod meshing with the gear and a steering arm rigidly connected to the gear.

2. In a steering device for automobiles, the combination with a bearing member, of a plate rotatably mounted thereon, an internal toothed gear mounted on said plate, a dust cap covering the gear, a steering arm mounted on the dust cap, bolts securing the plate, the gear, the dust cap and the steering arm rigidly together, a steering rod extending through the bearing member and a pinion on the end of said rod meshing with the teeth of said internal gear.

In testimony whereof, I affix my signature, in the presence of two witnesses.

W. BIRDLE ELAM.

Witnesses:
E. P. WANZER,
A. D. KNAPP.